United States Patent [19]

Mysels et al.

[11] 4,121,973
[45] Oct. 24, 1978

[54] NUCLEAR REACTOR WITH FUEL COLUMN COOLANT REGULATION

[75] Inventors: Karol J. Mysels, La Jolla; Arkal S. Shenoy, San Diego, both of Calif.

[73] Assignee: General Atomic Company, San Diego, Calif.

[21] Appl. No.: 641,646

[22] Filed: Dec. 17, 1975

[51] Int. Cl.² .......................................... G21C 15/08
[52] U.S. Cl. ....................................... 176/84; 176/59; 176/61
[58] Field of Search .................. 176/61, 65, 77, 84, 176/59, 72, 83

[56] References Cited

U.S. PATENT DOCUMENTS

| | | | |
|---|---|---|---|
| 3,156,625 | 11/1964 | Harty et al. | 176/72 X |
| 3,174,906 | 3/1965 | Rouge | 176/84 X |
| 3,220,926 | 11/1965 | Stoker | 176/84 X |
| 3,386,887 | 6/1968 | Mogard | 176/83 X |
| 3,607,643 | 9/1971 | Paget | 176/84 |
| 3,873,420 | 3/1975 | Statham | 176/77 |
| 3,891,502 | 6/1975 | Hackstein et al. | 176/84 X |

*Primary Examiner*—Peter A. Nelson
*Attorney, Agent, or Firm*—Fitch, Even, Tabin & Luedeka

[57] ABSTRACT

A nuclear reactor is described in which a core having a plurality of columnar fuel regions with coolant passages therein and valve means for each fuel region regulating, separately, the flow of coolant therethrough, is provided with collecting means at the downstream ends of the passages. The collecting means define a plurality of discharge orifices and a plurality of intake means, one for each of the discharge orifices. Each of the intake means commingles a portion of the coolant from each of a plurality of adjacent fuel regions in a respective one of the discharge orifices.

5 Claims, 6 Drawing Figures

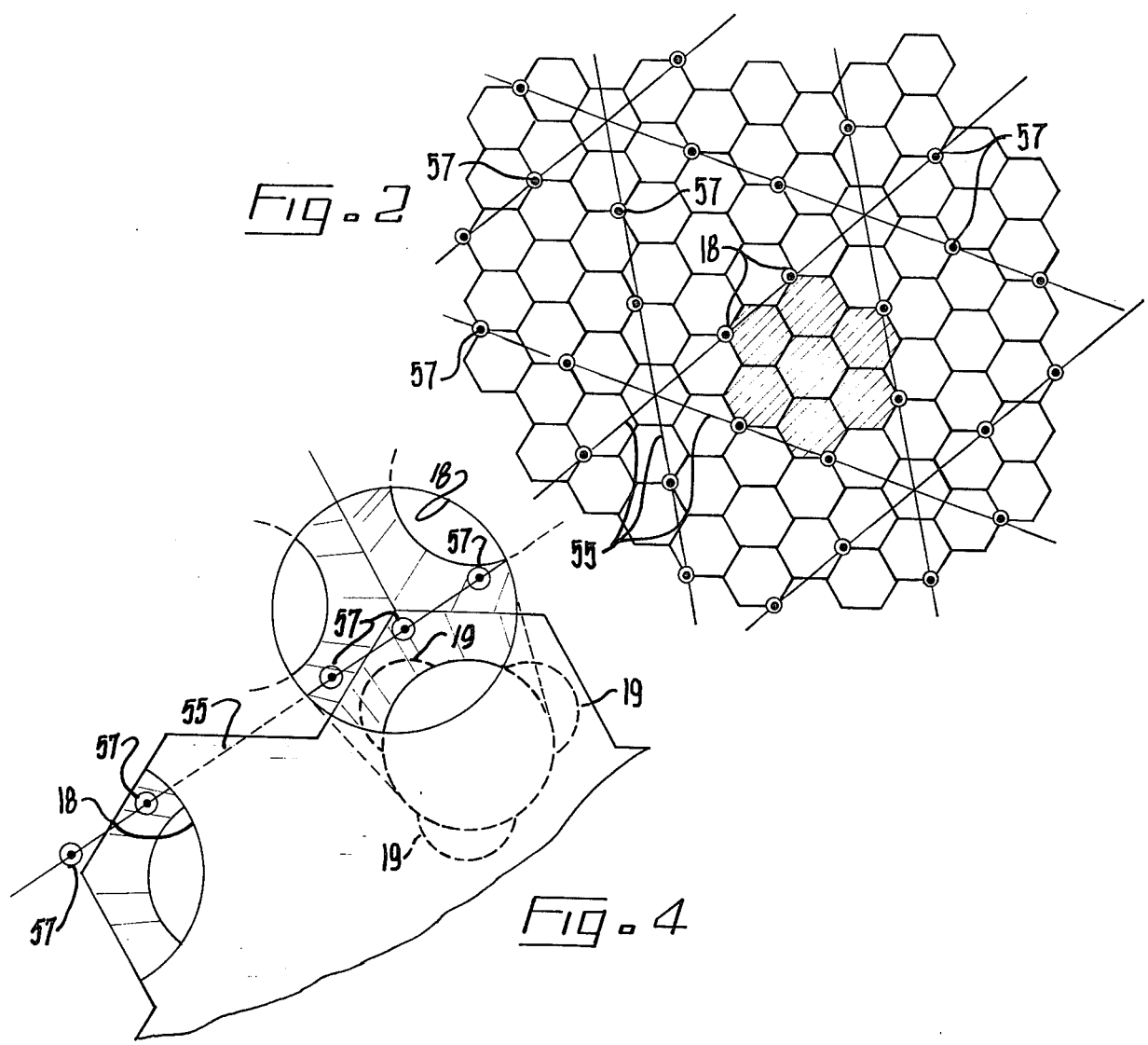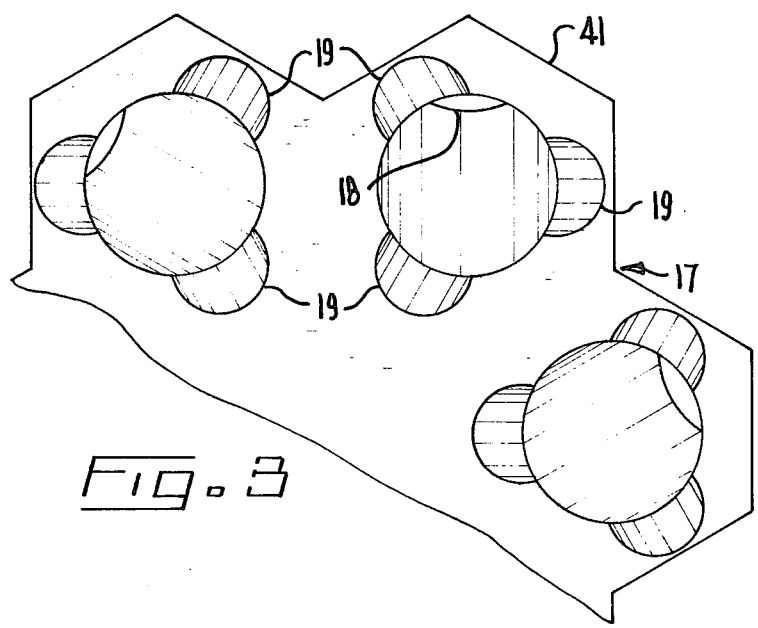

NUCLEAR REACTOR WITH FUEL COLUMN COOLANT REGULATION

This invention relates generally to nuclear reactors and, more particularly, to an improved construction for a fluid cooled nuclear reactor by which hot streaks in the fluid coolant are minimized.

In a fluid cooled nuclear reactor, a flowing fluid is passed through the reactor core to remove heat therefrom. The heated fluid coolant may then be employed for the purpose of producing steam for power generation, driving turbine machinery for power generation, applying heat in an industrial process, etc.

Localized regions of extremely high temperature within the reactor core may raise the temperature of coolant passing through that localized region to temperatures substantially above that of the average temperature of the coolant issuing from the core. These localized hot streams of coolant, commonly referred to as "hot streaks", may have an adverse effect on the core bottom plenum linings, cross duct lining, and heat exchanger coils in the reactor system. The need to allow for the possibility of hot streaks is one of the important limiting factors in reactor design and affects start-up and load following operation, orifice and thermocouple probe design, duct and reboiler materials, etc.

It is an object of the present invention to provide an improved nuclear reactor.

Another object of the invention is to provide a nuclear reactor which minimizes the presence of hot streaks.

A further object of the invention is to provide a nuclear reactor which combines the coolant flows from neighboring fuel regions in a manner which results in an averaging or evening of the coolant temperature at the outlet of the core.

Other objects of the invention will become apparent to those skilled in the art from the following description, taken in connection with the accompanying drawings wherein:

FIG. 2 is a top sectional view of a portion of the core of the reactor of FIG. 1, taken at the level of the line 2—2 of FIG. 1;

FIG. 3 is top view of a core support block used in the core of the reactor of FIG. 1;

FIG. 4 is a bottom view of the core support block of FIG. 3;

Figure 1:
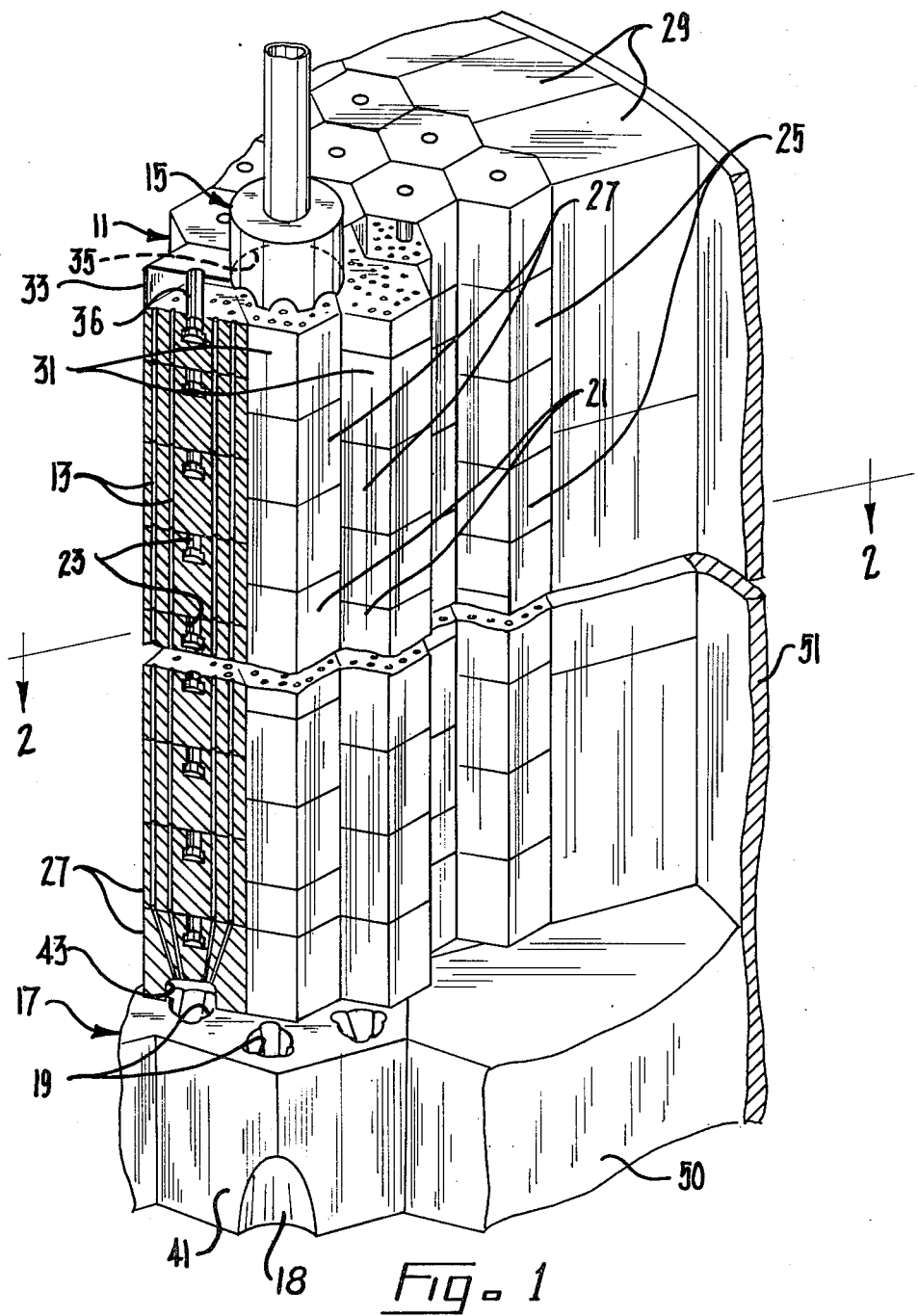
FIG. 1 is a perspective cut-away view, partially in section, illustrating a portion of a nuclear reactor constructed in accordance with the invention.

Very generally, the nuclear reactor of the invention comprises a core having a plurality of columnar fuel regions 11, each of said fuel regions having passages 13 for conducting fluid coolant through said fuel regions. Valve means 15 are provided for each of the fuel regions for separately regulating the flow of coolant passing through the passages therein. Collecting means 17 are provided at the downstream end of the passages and define a plurality of discharge orifices 18 and a plurality of intake means 19 for each of the discharge orifices. Each of the intake means commingles a portion of the coolant from each of a plurality of adjacent fuel regions and such commingled coolant is discharged from a respective one of said discharge orifices.

Referring now more particularly to the drawings, the specific construction of the core and some of its associated structure may be more clearly seen. The general shape of the core is that of a right circular cylinder having a diameter which is slightly greater than its height. The core is made up of a plurality of columns of separate fuel blocks 21 of hexagonal cross section arranged on a uniform triangular pitch. The fuel blocks are preferably of extruded graphite construction in which a plurality of rods (not shown) of fissionable material are imbedded. Each of the fuel blocks is provided with a plurality of openings which align to form the vertical passages 13 therein. The passages 13 extend completely through the fuel blocks and are located in the same position in each of the fuel blocks. Thus, the vertical passages extend completely through the length of each of the columns of fuel blocks. As will be explained subsequently, these vertical passages are utilized to pass coolant gas through the reactor core.

The fuel blocks 21 of the core contain vertical holes 23 therein in addition to the vertical passages 13. The holes 23 extend through only part of the length of each block in these columns and permit handling equipment, not shown, to be lowered into the block for raising and lowering same during fueling and refueling. Some of the columns of the fuel blocks 21 are displaced axially relative to the other columns to eliminate the possibility of transverse displacement of the fuel blocks across the core at their interfaces. Alignment of the passages 13 may be maintained by a plurality of graphite dowel pins (not shown) extending from the top face of each fuel block. The dowel pins on each fuel block fit into mating holes in the bottom of the block immediately above.

The core also includes a reflector. The reflector consists of an outer wall of graphite blocks 25 identical in shape to the fuel blocks 21. Additional reflector blocks 27 are disposed in the same columnar arrangement as the fuel blocks, forming continuations of the fuel block columns in two layers above and two layers below. The reflector blocks include passages forming continuations of the passages 13 in the fuel blocks. The height of some of the reflector blocks is different from the others in order to compensate for the vertical offset of some of the fuel block columns.

The radially outer portion of the reflector consists of a plurality of graphite reflector blocks 29, also arranged in columns. The reflector blocks 29 are substantially larger than the reflector blocks 25 and are shaped with two opposite angularly diverging sides, an arcuate side and an irregularly shaped side opposite the arcuate side. The irregular side of each reflector block 29 forms a mating engagement with adjacent columns of the reflector blocks 25, and the arcuate side forms part of an exterior cylindrical surface. The reflector configuration, of course, may be departed from, but the foregoing described configuration has been found satisfactory.

The reflector further consists of a top layer of reflector blocks 31 over the columns of the fuel blocks 21. Each of the reflector blocks 31 has passages therein forming a continuation of the passages 13 and is provided with a metal cap 33. The metal caps 33 extend above the top of the reflector blocks and form a hollow space above the upper ends of the coolant passages 13 for fuel block columns. A circular opening 35 is defined by the metal caps above each of a plurality of fuel regions, each region consisting of seven columns. An orificing apparatus or valve means 15 is placed in each of the openings 35 to control the flow rate of collant gas through the opening to each region 11 from the space above the core and reflector blocks. The vertical sides of the caps 33 are arranged so that the caps surrounding each of the openings form a separate plenum communicating with such opening. The outer columns of reflector elements 29 are not provided with caps but extend as solid blocks all the way to the top. Each of the caps 33 is provided with a central opening therein, and tubes 36, aligned with the holes 23, pass through such openings. The tubes 36 facilitate reception of a pickup tool, not shown, for removing the capped reflector blocks 31 during refueling.

The columns of fuel blocks and reflector blocks rest upon a layer of large graphite core support blocks 41. As shown in the drawings, each support block 41 supports the seven columns of fuel blocks in a respective fuel region 11. The columns of fuel and reflector blocks are positioned on the support blocks 41 by a plurality of graphite dowels (not shown) which provide lateral restraint and column alignment at the bottom of the core.

As may be seen from FIG. 1, the lowermost layer of reflector blocks 27 is designed such that the coolant passages 13 in each block converge into a collection chamber or discharge orifice 43 formed in each block. Each of the support blocks 41 has a plurality of intake ducts or passages 19, each passage communicating with a respective one of the chambers 43. As may be seen in FIGS. 3, 4 and 5, there are six intake passages in each support block 41. Each of the intake passages 19 diverges from the others to a partial outlet or discharge orifice 18 at the outside of the block. Each discharge orifice 18 is formed by parts of three adjacent blocks 41 and discharges the coolant gas below the layer of support blocks. Thus, the layer of core support blocks constitutes the collecting means 17.

The layer of core support blocks 41 is radially surrounded and continued by a plurality of larger core support blocks 50. The core support blocks 50 are shaped to mate with the blocks 41 and to form a cylindrical outer surface. The blocks 50 support the side columns of reflector blocks 25 and 29. A cylindrical metal shroud 51 surrounds the core.

The graphite core support blocks 41 and 50 are supported from a core support floor, not shown, by a plurality of vertical graphite posts, also not shown. The graphite posts have spherical ends to permit them to rock slightly to accommodate differential expansion between the parts of the structure.

Coolant gas collected in the space above the top of the reactor core and its surrounding reflector passes through the orifice openings 35 and into the plenums formed by the caps 33. The gas then enters the passages 13 flowing therethrough and into the chambers 43. As the gas flows through the passages 13, it is heated by the reactor core due to the heat generated by the fission chain reaction in the core. The hot gas is collected in the chambers 43 and then passes through the support blocks 41, through the passages 18 and 19 therein, and is discharged into the space below the lower support blocks 41. From there, the coolant gas passes through suitable ducts, not shown, to steam generators or turbines, also not shown.

As previously mentioned, the coolant is directed into the collection chambers 43 in the reflector blocks by suitably directing the lower ends of the passages 13. Suitable passages, not illustrated, are provided in the reflector block at the base of the central column in each seven column fuel region for the purpose of distributing the coolant passing through the passages 13 in the central column to the collection chambers 43 in the reflector blocks for the six peripheral columns.

The support blocks are shaped as shown in FIGS. 3 and 4 so that each support block is positioned under a respective fuel region. In FIG. 2, a view of a typical support block is shown by the cross-hatched area superimposed on the plan view of part of the core structure cross section. The locations of the discharge orifices 18 are also indicated superimposed on the plan view.

In the illustrated embodiment, each of the intake means 19 in the adjacent support blocks which communicate with a respective one of the support blocks discharge orifices 18 comprises a group of three manifolding passages. The collection chambers 43 in each column communicate with a respective one of the manifolding passages, and the three manifolding passages in each group are directed into one discharge orifice 18. The three manifolding passages combine in a single discharge orifice the outflow from the columns from three different fuel regions.

As a result of the foregoing described arrangement, the coolant from part of each region is mixed with coolant coming from two other regions in a single discharge orifice. Thus, coolant from each region issues through a total of six different discharge orifices, such discharge orifice carrying the coolant from three columns, each from a different region.

Figure 5:
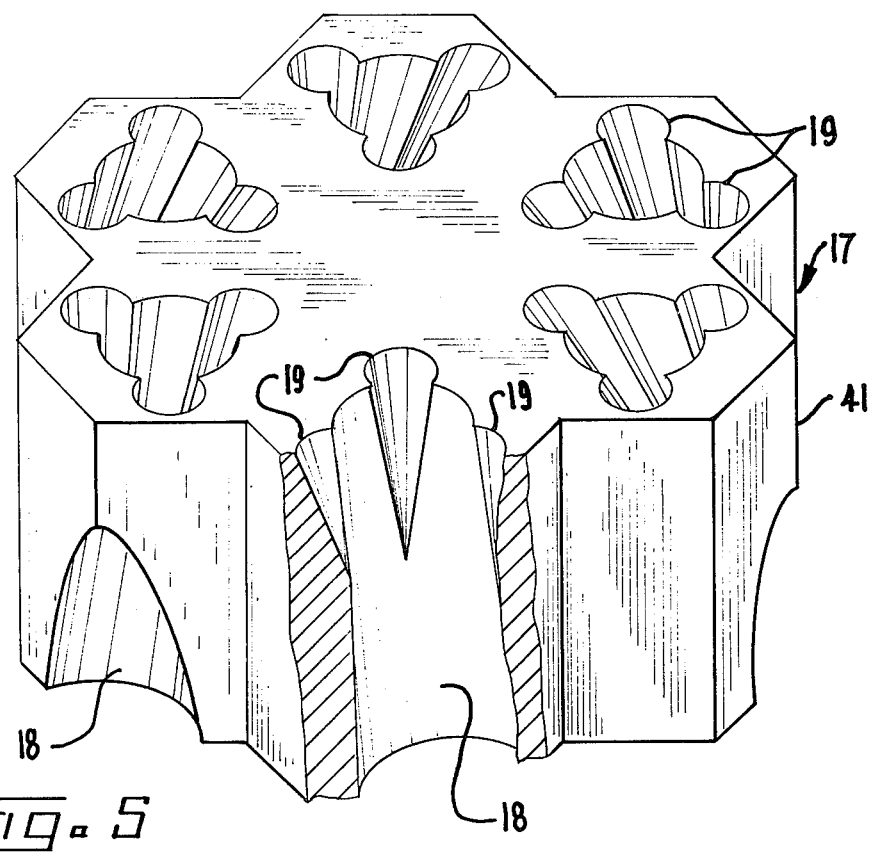
FIG. 5 is a partial sectional view of the core support block of FIGS. 3 and 4.

Referring to FIG. 5, the internal structure of a core support block may be more clearly seen. The discharge orifices are each formed by parts of three adjacent blocks, each block having six manifold passages.

In order to measure the temperature of coolant coming from each of the three columns just prior to their combining in the support block discharge orifice, a single straight thermocouple bundle 55 (FIG. 4) is used. As three circles gradually merge, there is always a transition region in which a straight line can pass through the three circles simultaneously. As may be seen in FIG. 4, one thermocouple 57 is provided for each of the joining columns. By this manner, six thermocouples per region are provided which provides no redundancy per column but a considerable redundancy per region. Thus, even if two thermocouples are inactive, information about the region's behaviour is still supplied by four others.

As shown in FIG. 2, three thermocouple bundles 55 may be used for each region, each of which has thermocouples 57 for two of the discharge orifices 18 below that region. The three bundles run in different directions and cross another bundle serving the same region only at one point. Common mode failure possibilities are thus greatly reduced. Only an accident at a specific point can disable two of the three bundles at the same time and an accident would have to spread through six columns to disable all three bundles.

The information provided from the six thermocouples serving each region may be applied to a control computer (not shown) and averaged to adjust the coolant flow orificing means 15 for that region. The readings from each column may be used individually to evaluate column imbalance, column power distribution, and column average graphite and fuel temperatures. The information may also be averaged in groups of three to provide information about actual coolant temperature distribution and thus determine if any hot streaks remain.

During reactor operation, the coolant flow through various regions may be varied depending upon the life of the fuel in a particular region. Since in the design of the invention each outlet from the core support structure carries the flow from three regions, each of which may be at a different stage of life and therefore with different coolant flows, the total flow is less for the same cross section, and the pressure drop in the core support block is lowered.

Figure 6:
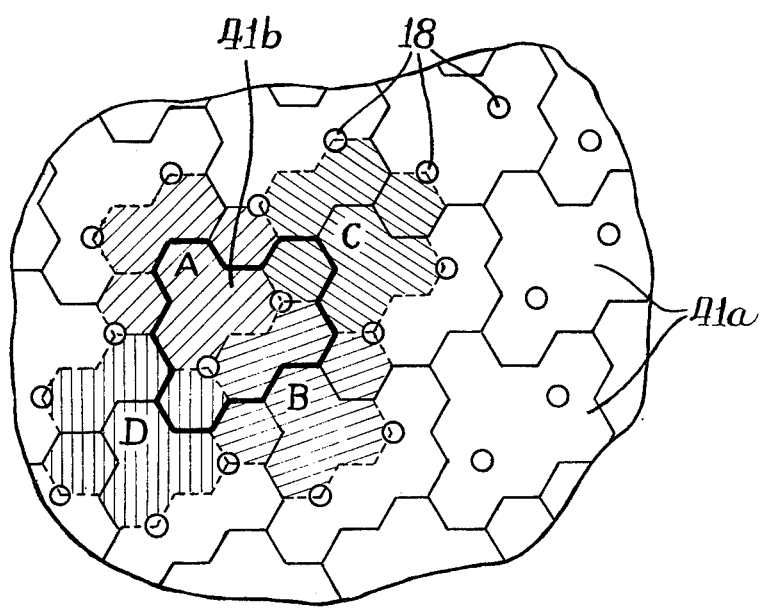
FIG. 6 is a plan view of a core support structure which constitutes a further embodiment of the invention.

In FIG. 6, an alternative embodiment is illustrated. Here the core support blocks 41a and 41b are irregularly shaped. Each core support block is shaped to extend under portions of four adjacent fuel regions as shown in detail for support block 41b (heavily outlined in FIG. 6) and the four fuel regions A, B, C and D shown by dotted lines and shadings. The support block 41b extends under the central column and two adjacent peripheral columns of region A, under two adjacent peripheral columns of region B and under one peripheral column of each of regions C and D. Thus, each core support block supports a total of seven fuel block columns, one of which is a central column from one fuel region and six of which are peripheral columns from that region and three other adjacent fuel regions. The discharge orifices 18 are thus each located entirely within a core support block and not formed by the juncture of three such blocks as in the embodiment of FIGS. 2-5.

It may be seen, therefore, that the core of the invention is less susceptible to deleterious affects caused by hot streaks. A homogenizing of the coolant results and temperature monitoring is facilitated.

Various modifications of the invention in addition to those shown and described herein will become apparent to those skilled in the art from the foregoing description and accompanying drawings. Such modifications are intended to fall within the scope of the appended claims.

What is claimed is:

1. A nuclear reactor comprising a core having a plurality of columnar fuel regions, each of said fuel regions being comprised of a plurality of columns of disengageably assembled fuel elements having aligned passages therein for conducting fluid coolant through said columns, a plurality of flow regulating means, one for each of said columnar fuel regions for separately regulating the flow of coolant passing through said passages therein, each of said columns having a reflector block at the downstream end thereof, each of said reflector blocks having a single discharge orifice and having manifolding passages therein for collecting the coolant from all of said passages in a respective one of said columns into said single discharge orifice, and a plurality of support blocks for said core, said support blocks having discharge orifices and manifolding ducts therein, each of said support block manifolding ducts communicating between a single support block discharge orifice and a group of said reflector block discharge orifices distributed among different ones of said fuel regions, whereby coolant from several of said fuel regions is discharged from each of said support block discharge orifices, and temperature measuring means positioned in each of said support block manifolding ducts.

2. A nuclear reactor according to claim 1 wherein said columns are of hexagonal cross section, wherein each of said regions comprises six of said columns arranged about a seventh column, and wherein each of said support blocks is formed to extend under a respective one of said fuel regions, and wherein each of said discharge orifices is defined by portions of three adjacent support blocks.

3. A nuclear reactor according to claim 1 wherein said columns are hexagonal in cross section, wherein each of said regions comprises six of said columns arranged peripherally about a seventh central column wherein said support blocks are formed to extend under three adjacent columns including the central one of a first region, two columns of a second region adjacent to said first region both columns adjacent to said first region, and one column from each of two further regions each adjacent to said first and said second regions.

4. A nuclear reactor according to claim 1 wherein said temperature measuring means is positioned in each of said support block manifolding ducts to measure the temperature in each of the respective reflector block discharge orifices.

5. A nuclear reactor according to claim 1 wherein said temperature measuring means is positioned in each of said support block manifolding ducts to measure the temperature of coolant coming principally from one only of said reflector block discharge orifices.

* * * * *

UNITED STATES PATENT AND TRADEMARK OFFICE
CERTIFICATE OF CORRECTION

PATENT NO. : 4,121,973

DATED : October 24, 1978

INVENTOR(S) : Karol J. Mysels and Arkal S. Shenoy

It is certified that error appears in the above—identified patent and that said Letters Patent are hereby corrected as shown below:

Col. 1, line 48, "is top view" should read --is a top view--.

Col. 4, line 29, "orifices, such" should read --orifices, each--.

Signed and Sealed this

Twenty-fifth Day of September 1979

[SEAL]

Attest:

LUTRELLE F. PARKER

Attesting Officer     Acting Commissioner of Patents and Trademarks